US005841345A

United States Patent [19]

Kestenberg

[11] Patent Number: 5,841,345

[45] Date of Patent: Nov. 24, 1998

[54] TWO-WAY COMMUNICATION DEVICE HAVING EMERGENCY DETECTING COMPONENT

[76] Inventor: Howard J. Kestenberg, 59 Sowams Rd., Barrington, R.I. 02806

[21] Appl. No.: 890,487

[22] Filed: Jul. 9, 1997

[51] Int. Cl.[6] .......... B60Q 1/00

[52] U.S. Cl. .......... 340/440; 340/461; 340/539; 340/540; 340/691; 340/693; 455/575

[58] Field of Search .......... 340/426, 427, 340/429, 438, 440, 461, 462, 539, 573, 691, 693, 540, 850; 455/66, 73, 88, 90, 566, 575; 367/134

[56] References Cited

U.S. PATENT DOCUMENTS

| | | | |
|---|---|---|---|
| 3,798,593 | 3/1974 | Sartor | 340/440 |
| 3,909,773 | 9/1975 | Saltzer | 367/134 |
| 4,349,809 | 9/1982 | Tomes | 340/440 |
| 4,563,758 | 1/1986 | Paternostro | 367/132 |
| 4,598,272 | 7/1986 | Cox | 340/539 |
| 4,679,177 | 7/1987 | Aoyagi et al. | 367/132 |
| 4,829,285 | 5/1989 | Brand et al. | 340/573 |
| 4,833,452 | 5/1989 | Currier | 340/539 |
| 4,978,946 | 12/1990 | Nordholm et al. | 340/573 |
| 5,444,671 | 8/1995 | Tschannen et al. | 368/10 |
| 5,592,156 | 1/1997 | James | 340/850 |

*Primary Examiner*—Daniel J. Wu
*Attorney, Agent, or Firm*—Salter & Michaelson

[57] ABSTRACT

A two-way communication device includes a central processing unit, a power source in electrical communication with the central processing unit, and a transmitter/receiver unit capable of transmitting and receiving electromagnetic signals. The transmitter/receiver unit is also in electrical communication with the central processing unit. A display, connected to the central processing unit, is capable of displaying messages. A key pad, also in electrical communication with the central processing unit, has a plurality of keys, each of which are capable of generating a specific message. An emergency detecting component, in electrical communication with the central processing unit, is capable of detecting a specific emergency and relating information about the emergency to the central processing unit. The arrangement is such that upon such detection of an emergency by the emergency detecting component, the transmitter/receiver unit transmits a message about the emergency on the display of another identically constructed device.

12 Claims, 4 Drawing Sheets

TWO-WAY COMMUNICATION DEVICE HAVING EMERGENCY DETECTING COMPONENT

BACKGROUND OF THE INVENTION

This invention relates generally to communication devices, and more particularly to a two-way communication device that is capable of detecting certain types of emergencies, for example, the laying down of a motorcycle, or a scuba diver going below a pre-determined depth.

Two-way communication devices are well known in the communications art. Reference can be made to any of the U.S. Pat. Nos. 3,909,773 to Saltzer, 4,563,758 to Paternostro, 4,679,177 to Aoyagi et al., and 5,444,671 to Tschannen et al. for examples of such two-way communication devices. However, none of these devices are specifically designed for detecting an emergency-type situation, and transmitting an emergency signal to another device which is proximate to another person.

For example, in motorcycle clubs or situations when two or more motorcyclists ride together, it is often desirable to be able to communicate between the motorcyclists. In this regard, hand signals and other types of rudimentary means of communicating are frequently used. If one of the riders should happen to get in an accident or otherwise lay his or her motorcycle down, it is particularly desirable to be able to automatically communicate this emergency to the other riders. However, in an accident situation, especially if the rider is injured, he or she cannot manipulate the device in order to send a message. All of the foregoing devices are incapable of automatically sending an emergency signal to the other persons carrying the device.

Similar situations exist with other extracurricular activities as well. When scuba diving, for example, it is desirable to communicate with other divers. In fact, each of the above-identified patents are directed to devices which provide two-way communication between scuba divers. However, none of these devices are particularly suited for detecting emergencies, such as a diver going below a pre-determined depth, and for transmitting such emergencies to the other divers.

Thus, there is a need for a two-way communication device that is capable of detecting an emergency and transmitting information about that emergency to persons in communication with that person.

SUMMARY OF THE INVENTION

In general, the present invention is directed to a two-way communication device comprising a central processing unit, a power source in electrical communication with the central processing unit, and a transmitter/receiver unit capable of transmitting and receiving electromagnetic signals. The transmitter/receiver unit is also in electrical communication with the central processing unit. A display is in electrical communication with the central processing unit, the display being capable of displaying messages. A key pad, also in electrical communication with the central processing unit, has a plurality of keys, each of which capable of generating a specific message. An emergency detecting component, in electrical communication with the central processing unit, is capable of detecting a specific emergency and relating information about the emergency to the central processing unit. Thus, upon such detection of an emergency by the emergency detecting component, the transmitter/receiver unit transmits a message about the emergency on the display of another identically constructed device.

In one aspect of the present invention, the emergency detecting component comprises a tilt switch responsive to being tilted greater than a pre-determined angle of rotation. In another aspect of the invention, the emergency detecting component comprises a pressure sensing element for sensing pressure greater than a pre-determined value.

Accordingly, among the several objects of the present invention are: the provision of an improved two-way communication device which is especially suited for detecting an emergency situation, such as a motorcyclist being involved in an accident, or a scuba diver exceeding a pre-determined depth, and relating information about the emergency to others having similar devices; the provision of such an improved device which is capable of enabling two or more persons to communicate with one another; the provision of such an improved device having a key pad with a plurality of keys that enable the transmission of specific messages (e.g., "gas next exit" or "air"); the provision of such an improved device which is especially suited for use during motorcycling and scuba diving; and the provision of such an improved device which is easy to use.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENTS

Figure 1:
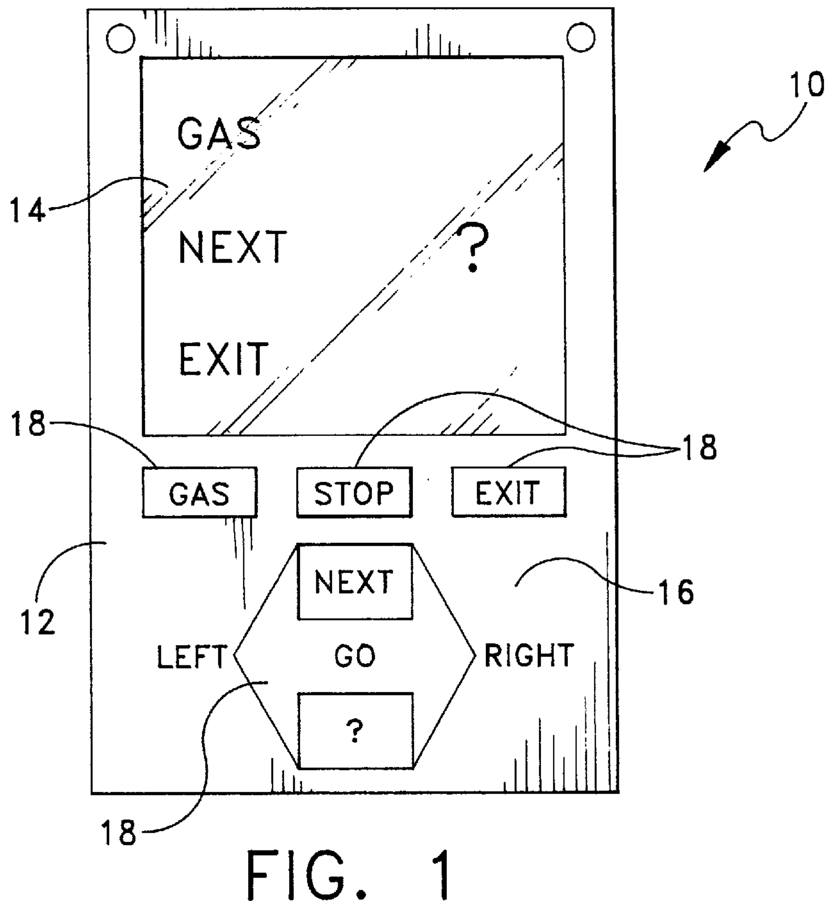
FIG. 1 is a top plan view of a display and a key pad of a two-way communication device of the present invention.
Figure 2:
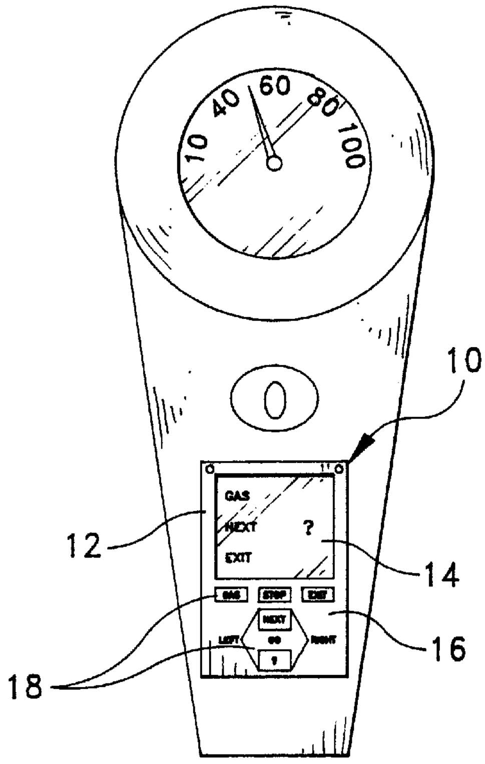
FIG. 2 is a top plan view of the display and key pad of the two-way communication device illustrated in FIG. 1 being incorporated on a gas tank of a motorcycle.
Figure 3:
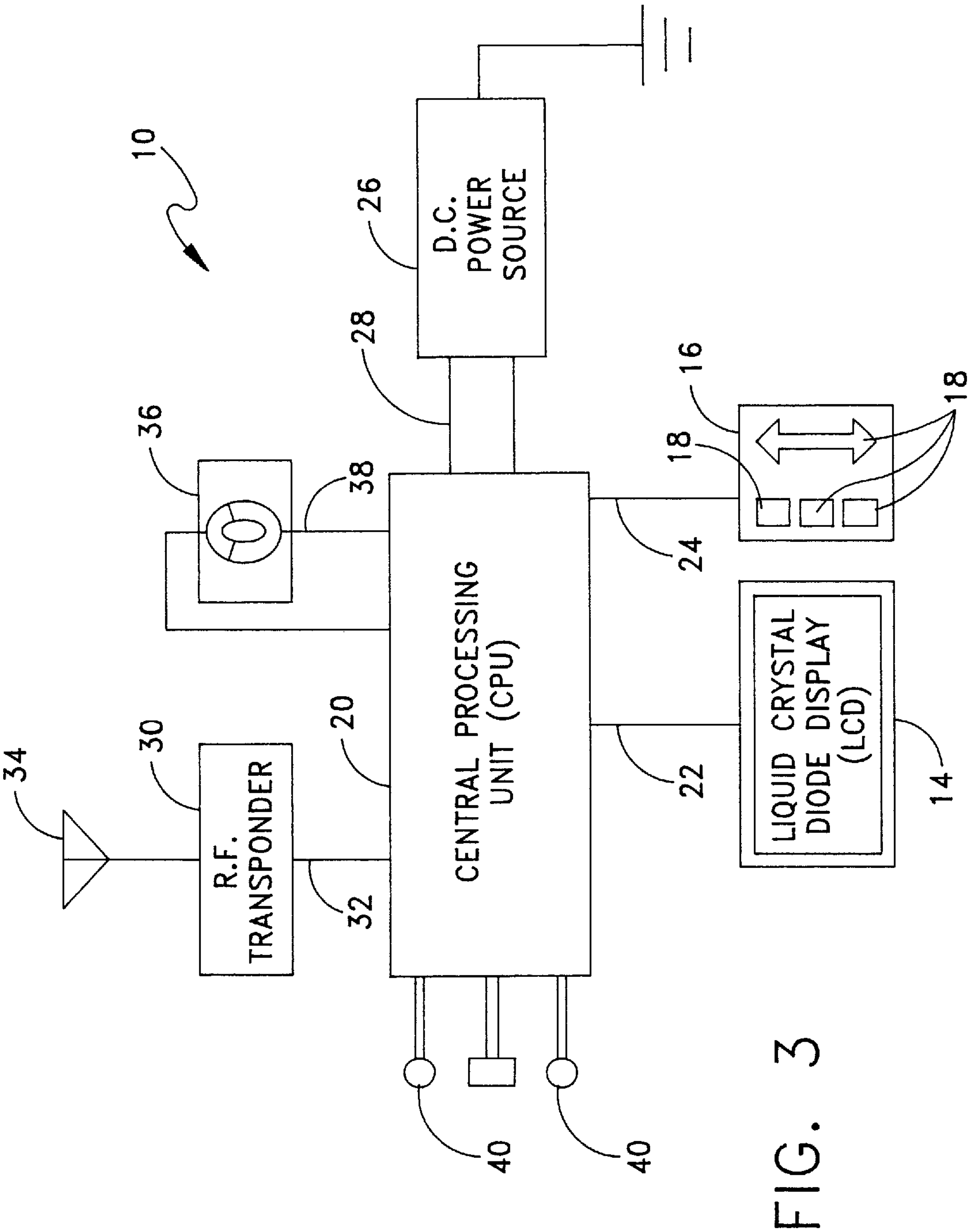
FIG. 3 is a schematic view of the two-way communication device illustrated in FIGS. 1 and 2.

Referring to the drawings, and to FIGS. 1–3 in particular, there is generally indicated at 10 a two-way communication device of the present invention. Similar to the devices disclosed in the patents to Saltzer, Paternostro, Aoyagi et al., and Tschannen et al., the two-way communication device 10 of the instant invention is also capable of enabling communication between two or more persons. However, unlike the devices of these patents, the device 10 is provided with an "emergency detecting component" for detecting specific emergency situations and relating information about the emergency to others having the device 10. In the embodiment illustrated in FIGS. 1–3, the device 10 is especially suited for use during motorcycling where certain messages directly relating to this type of activity are programmed into the device.

As illustrated in FIG. 1, the device 10 includes a housing 12 which accommodates the components of the device therein. More specifically, the device 10 further includes a display 14 which is capable of displaying messages and a key pad 16 for punching in specific messages. The display 14 and the key pad 16 are provided in the upper surface of the housing 12 so as to be readily accessible and visible by the user of the device 10. The key pad 16 includes a plurality of keys 18, each capable of generating a specific message pertinent to motorcycling. For example, three of the keys 18 are designated by the words "gas", "stop" and "exit", which, when pressed by the user, indicates to other riders that the operator wants to stop for gas, stop and turn on the next exit, respectively. Another key 18 is designed to indicate the direction of travel desired of the operator to the other riders.

Preferably, the display 14 is a liquid crystal display which can be programmed to illustrate the messages described above. In addition, the device 10 can indicate certain messages and emergency situations by sound as well as sight by providing a small speaker (not shown) in the housing 12. As illustrated in FIG. 2, the housing can be mounted on a gas tank of a motorcycle, or any other convenient, visible area, by two-sided adhesive tape, or by mechanical fasteners.

Turning now to FIG. 3, the device 10 further includes a central processing unit 20 for controlling the operation of the device. The central processing unit 20 can be chosen from among any of the commercially available microprocessors suitable for this type of application. It is understood that a person having ordinary skill in the art of computers would readily appreciate the type of central processing unit required for this application. As shown, the central processing unit 20 is in electrical communication with the display 14 by a line 22 and with the key pad by another line 24. A suitable power source 26 is provided to supply power to the device 10. The power source 26 electrically communicates with the central processing unit 20 by line 28, and can embody a relatively small-voltage battery, or the battery of the motorcycle, if desired.

The device 10 further includes a transmitter/receiver unit 30 which is in electrical communication with the central processing unit 20 by line 32. As with the central processing unit 20, the transmitter/receiver unit 30 can be chosen from any of the commercially available, well known units. Preferably, the transmitter/receiver unit 30 has an antenna 34 that enables the unit 30 to pick up and transmit radio signals. The maximum range of the transmitter/receiver unit 30 should be approximately one quarter of a mile; however, greater distances are contemplated.

A mercury tilt switch is indicated by reference numeral 36 in FIG. 3. The tilt switch 36 is provided for detecting when the device 10 (which is mounted on the motorcycle) exceeds a pre-determined angle of rotation with respect to a vertical plane; it being understood that such tilt switches are commonly available through normal electronics channels of trade. For example, the tilt switch 36 can be set for detecting a tilt angle of greater than forty-five degrees or sixty degrees with respect to the vertical plane. As illustrated, it is in electrical communication with the central processing unit by line 38. It is contemplated that several diodes 40 can be provided on the outside of the central processing unit 20 to indicate such an emergency situation, or to indicate whether the device 10 is turned on or off.

The arrangement is such that when the device 10 is tilted greater than a pre-determined angle, e.g., forty-five degrees, the tilt switch 36 detects the angle of tilt and transmits this information to the central processing unit 20 by line 38. The central processing unit 20 is programmed to transmit a signal to any other devices 10 that may be provided on vehicles accompanying the operator of the motorcycle. This radio signal is received by the transmitter/receiver unit(s) of the other device(s) 10 whereby a message is shown on the display(s) 14 of the device(s) 10 that the operator of the motorcycle having the device has laid down his or her motorcycle. The other operators can then assist that operator having the downed motorcycle or call for help.

During operation, the operator of the vehicle on which the device 10 is mounted can send specific messages to operators of vehicles having identically constructed devices. For example, if one operator decides that he needs fuel at the next exit, he can press a key 18 or keys to signal such to the other operators. Specifically, by pressing the key 18 or keys, the central processing unit 20 instructs the transmitter/receiver unit 30 to send an electromagnetic (radio) signal to any other device 10 or devices within the area of the device sending the signal. The operator(s) of the other device(s) has this message shown on the display 14 of his or her own device 10. In addition, if an emergency situation exists wherein the operator is involved in an accident thereby triggering the tilt switch 36, this situation is conveyed to the other operator(s) as well.

Figure 4:
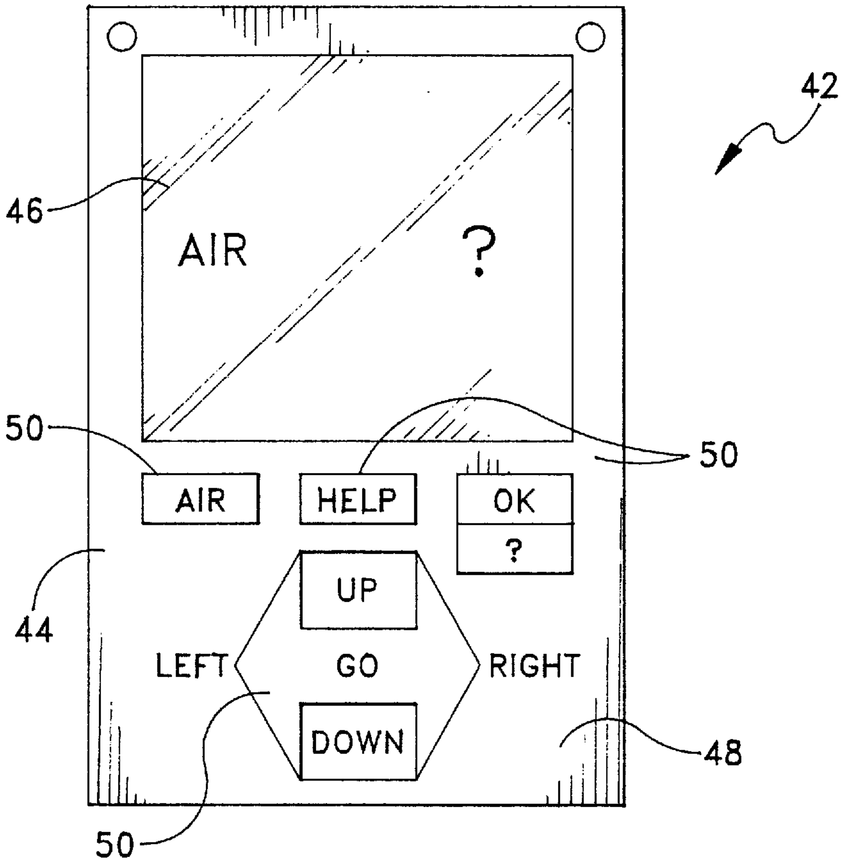
FIG. 4 is a top plan view of a display and a key pad of a two-way communication device of another preferred embodiment.
Figure 5:
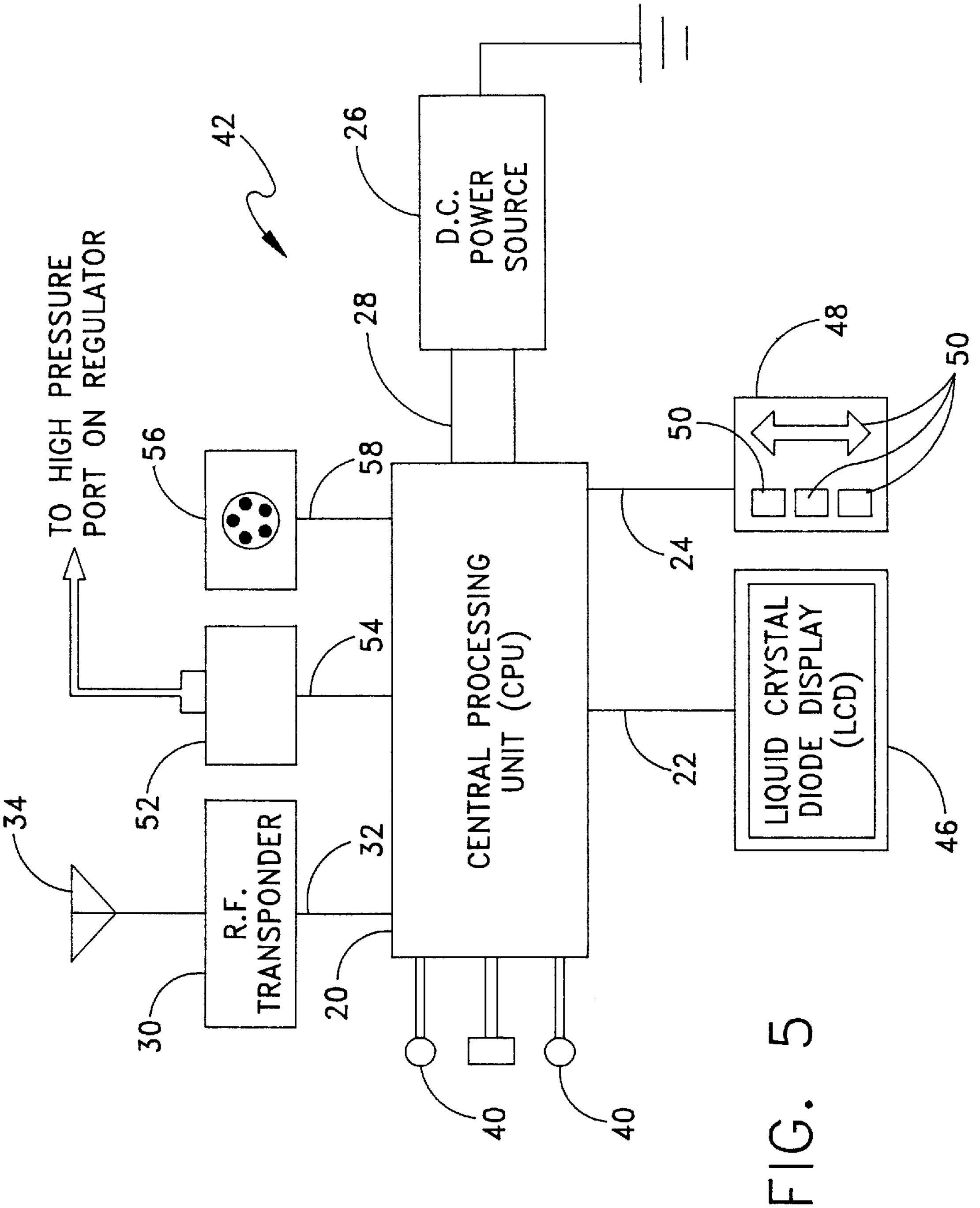
FIG. 5 is a schematic view of the two-way communication device illustrated in FIG. 4.

Referring to FIGS. 4 and 5, there is generally indicated at 42 a device of another preferred embodiment which is especially suited for scuba diving. As shown in FIG. 4, the device 42 also includes a housing 44 having a liquid crystal display 46 and a key pad 48 with a plurality of keys 50 for selecting specific messages which are to be sent by the device 42. With this embodiment of the present invention, the messages are directed to situations pertinent to scuba diving, such as "air", "help", and "up". The device 42 can be worn by the diver, as on diver's wrist, or provided on the scuba diving equipment.

Turning to FIG. 5, the device 42 is constructed similarly to device 10 wherein similar components are designated by the same reference numerals. The major difference between device 42 and device 10 other than the displays and key pads, is that instead of the tilt switch 36, there is provided an air supply sensor 52 for detecting pressure within the diver's air tank below a predetermined value, e.g., 500 psi. The air supply sensor 52 is in electrical communication with the central processing unit 20 by line 54. Once triggered, the central processing unit 20 relates the diver's low pressure to other divers by sending out a signal via the unit 30.

Also, the device 42 includes a pressure sensing element 56 which is in electrical communication with the central processing unit 20 by line 58. For example, the pressure sensing element 56 can be programmed to activate upon reaching a pressure equivalent to the water pressure at a depth of 120 feet. Thus, when a diver reaches a depth sufficient to trigger the pressure sensing element 56, the central processing unit 20 of the device 42 is programmed to transmit a message to other diver(s) having the device(s). Thus, the device 42 is especially designed as an extra safety measure when diving in groups of two or more divers.

It should be observed that the devices 10, 42 of the present invention are capable of detecting specific emergencies which enable others using such a device to detect the emergency and take immediate and appropriate action. In fact, the general concept behind devices 10, 42 can be used in other situations where two-way communication is desired, such as biking, hiking, military, etc. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A two-way communication device comprising:

a central processing unit;

a power source in electrical communication with the central processing unit;

a transmitter/receiver unit capable of transmitting and receiving electromagnetic signals, said transmitter/receiver unit being in electrical communication with the central processing unit;

a display in electrical communication with the central processing unit, said display being capable of displaying messages;

a key pad in electrical communication with the central processing unit, said key pad having a plurality of keys, each of which being capable of generating a specific message; and an emergency detecting component in electrical communication with the central processing unit, said emergency detecting component being capable of detecting a specific emergency and relating information about the emergency to the central processing unit, wherein upon such detection of an emergency by the emergency detecting component, the transmitter/receiver unit transmits a message about the emergency on the display of another identically constructed device.

2. The device as set forth in claim 1 further comprising an antenna for receiving said electromagnetic signals.

3. The device as set forth in claim 2, said electromagnetic signals being radio signals.

4. The device as set forth in claim 1, said display being a liquid crystal display.

5. The device as set forth in claim 1, said display having a plurality of light emitting diodes which flash on and off upon receiving a signal relating to an emergency.

6. The device as set forth in claim 1, said emergency detecting component comprising a tilt switch responsive to being tilted greater than a pre-determined angle of rotation.

7. The device as set forth in claim 1, said tilt switch being a mercury tilt switch.

8. The device as set forth in claim 1, said emergency detecting component comprising a pressure sensing element for sensing pressure greater than a pre-determined value.

9. A two-way communication device for use with a motorcycle, said device comprising:

a central processing unit;

a power source in electrical communication with the central processing unit;

a transmitter/receiver unit capable of transmitting and receiving electrical signals, said transmitter/receiver unit being in electrical communication with the central processing unit;

a display in electrical communication with the central processing unit, said display being capable of displaying messages;

a key pad in electrical communication with the central processing unit, said key pad having a plurality of keys, each of which being capable of generating a specific message; and a tilt switch in electrical communication with the central processing unit, said tilt switch being capable of detecting the tilting of the motorcycle greater than a pre-determined angle of rotation and relating such detection to the central processing unit, wherein upon such detection by the tilt switch, the transmitter/receiver unit transmits a message about the tilting of the motorcycle on the display of another identically constructed device.

10. The device as set forth in claim 8, said tilt switch being a mercury tilt switch.

11. The device as set forth in claim 8 further comprising a housing for containing the a central processing unit, the power source, the transmitter/receiver unit, the display, the key pad, and the tilt switch, said housing being mounted on the motorcycle.

12. The device as set forth in claim 8, said display having a plurality of light emitting diodes which flash on and off upon receiving a signal relating to an emergency.

* * * * *